(12) United States Patent
Huang

(10) Patent No.: US 11,782,590 B2
(45) Date of Patent: Oct. 10, 2023

(54) SCENE-OPERATION METHOD, ELECTRONIC DEVICE, AND NON-TRANSITORY COMPUTER READABLE MEDIUM

(71) Applicants: SHENZHEN HEYTAP TECHNOLOGY CORP., LTD., Guangdong (CN); GUANGDONG OPPO MOBILE TELECOMMUNICATIONS CORP., LTD., Guangdong (CN)

(72) Inventor: Xiangwen Huang, Guangdong (CN)

(73) Assignees: SHENZHEN HEYTAP TECHNOLOGY CORP., LTD., Guangdong (CN); GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/518,566

(22) Filed: Nov. 3, 2021

(65) Prior Publication Data
US 2022/0057927 A1 Feb. 24, 2022

Related U.S. Application Data

(63) Continuation of application No. PCT/CN2019/087312, filed on May 16, 2019.

(51) Int. Cl.
*G06F 3/04847* (2022.01)
*G06F 16/24* (2019.01)
(Continued)

(52) U.S. Cl.
CPC .......... *G06F 3/04847* (2013.01); *G06F 16/24* (2019.01); *H04L 67/306* (2013.01); *G16Y 10/75* (2020.01)

(58) Field of Classification Search
CPC ... G06F 3/04847; G06F 16/24; H04L 67/306; H04L 67/125; H04L 12/2821; H04L 12/2823; G16Y 10/75
See application file for complete search history.

(56) References Cited

U.S. PATENT DOCUMENTS

2006/0209690 A1 9/2006 Brooke
2015/0112667 A1 4/2015 Masayuki et al.
(Continued)

FOREIGN PATENT DOCUMENTS

CN 104142659 A 11/2014
CN 104731880 A 6/2015
(Continued)

OTHER PUBLICATIONS

WIPO, International Search Report for PCT/CN2019/087312, dated Feb. 3, 2020.
(Continued)

*Primary Examiner* — Jennifer N Welch
*Assistant Examiner* — Ashley M Fortino
(74) *Attorney, Agent, or Firm* — Hodgson Russ LLP

(57) ABSTRACT

Disclosed in the present application are a scene-operation method, an electronic device, and a non-transitory computer readable medium, relating to the field of the Internet of Things. The method includes: acquiring a plurality of scenes corresponding to a scene-trigger condition; acquiring a priority of each scene of the plurality of scenes; sorting the plurality of scenes according to the priority of each scene, and obtaining an execution sequence for the plurality of scenes; and executing the plurality of scenes according to the execution sequence.

17 Claims, 7 Drawing Sheets

(51) Int. Cl.
*G16Y 10/75* (2020.01)
*H04L 67/306* (2022.01)

(56) References Cited

U.S. PATENT DOCUMENTS

| | | | |
|---|---|---|---|
| 2016/0277203 A1* | 9/2016 | Jin | H04L 12/282 |
| 2016/0342906 A1* | 11/2016 | Shaashua | H04L 67/306 |
| 2017/0167746 A1* | 6/2017 | Harris | G05B 13/0265 |
| 2018/0213439 A1 | 7/2018 | Uchino et al. | |
| 2018/0219967 A1* | 8/2018 | Qian | H04L 67/303 |

FOREIGN PATENT DOCUMENTS

| | | |
|---|---|---|
| CN | 104754821 | 7/2015 |
| CN | 105681835 A | 6/2016 |
| CN | 107861816 A | 3/2018 |
| CN | 108111378 | 6/2018 |
| CN | 108873730 | 11/2018 |
| CN | 109101601 | 12/2018 |
| EP | 2387128 A1 | 11/2011 |
| EP | 3016036 A1 | 5/2016 |
| WO | 2015070708 A1 | 5/2015 |
| WO | 2017219883 | 12/2017 |

OTHER PUBLICATIONS

CNIPA, First Office Action for CN Application No. 201980093757.0, dated Mar. 8, 2022.

Rui, "The Research on Industrial Design of Intelligent Home Service Robot", Thesis submitted to Southeast University for the Academic Degree of Master of Engineering, May 2017.

Ventura, et al., "Smart EDIFICE—Smart EveryDay Interoperating Future devICEs", Jun. 2015.

EPO, Extended European Search Report for EP Application No. 19928693.1, dated Mar. 30, 2022.

CNIPA, Notification to Grant Patent Right for Invention for CN Application No. 201980093757.0, dated Jul. 8, 2022.

EPO, Communication for EP Application No. 19928693.1, dated May 26, 2023.

* cited by examiner

SCENE-OPERATION METHOD, ELECTRONIC DEVICE, AND NON-TRANSITORY COMPUTER READABLE MEDIUM

CROSS REFERENCE TO RELATED APPLICATION

This application is a continuation of International Application No. PCT/CN2019/087312, filed on May 16, 2019, the entire disclosure of which is incorporated herein by reference.

TECHNICAL FIELD

The disclosure relates to the field of Internet of Things, and more specifically, to a scene-operation method, an electronic device, and a non-transitory computer readable medium.

BACKGROUND

Smart Home is a residential platform, which integrates facilities related to home life by using integrated wiring technology, network communication technology, security technology, automatic control technology, audio and video technology, and constructs an efficient management system for residential facilities and family schedule affairs, thereby improving the safety, convenience, comfort and artistry of home, and achieving an environment-friendly and energy-saving living environment.

The scene includes occasion and environment, that is, the environment of a particular occasion. The meaning of scene control in a smart home refers to the control of lights, background music and other household smart devices according to specific needs for a specific occasion, for enabling users to obtain the best experience. However, currently, the scenes are generally executed sequentially according to the time defined by the scenes, and the setting of the scene is single.

SUMMARY

The disclosure proposes a scene-operation method, an electronic device, and a non-transitory computer readable medium to improve the defects mentioned above.

In an aspect, the embodiments of the disclosure provide a scene-operation method, including: acquiring a plurality of scenes corresponding to a scene-trigger condition; acquiring a priority of each scene of the plurality of scenes; sorting the plurality of scenes according to the priority of each scene, and obtaining an execution sequence for the plurality of scenes; and executing the plurality of scenes according to the execution sequence.

In another aspect, the embodiments of the disclosure further provide an electronic device, including: one or more processors; a memory; and one or more application programs stored in the memory. The one or more application programs, when executed by the one or more processors, are configured to implement the above method.

In further another aspect, the embodiments of the disclosure further provide a non-transitory computer readable medium. The non-transitory computer readable medium stores program codes which, when called and executed by a processor, causes the processor to perform the above method.

BRIEF DESCRIPTION OF THE DRAWINGS

In order to explain the technical solutions in the embodiments of the disclosure more clearly, the drawings needed in the description of the embodiments will be briefly introduced below. Obviously, the drawings in the following description are only some embodiments of the disclosure. For those of ordinary skill in the art, other drawings can be obtained based on these drawings without paying creative work.

DETAILED DESCRIPTION OF PREFERRED EMBODIMENTS

To enable those of ordinary skill in the art to better understand the solutions of the disclosure, the technical solutions in the embodiments of the disclosure will be described clearly and completely with reference to the drawings in the embodiments of the disclosure.

Internet of Things is a network concept of extending and expanding its client to any object-to-object for information exchange and communication on the basis of the "Internet concept". With the development of Internet of Things technology, some scenarios can be configured in the Internet of Things system. For the configured scenario, multiple controlled devices may be involved, and the multiple controlled devices have a certain linkage relationship and can work together.

The controlled device can be projector, projection screen, smart light, smart socket, human sensor, door and window sensor, wireless switch, air conditioning partner, smoke alarm, smart curtain motor, air purifier, smart speaker, and other mobile terminals. In an implementation, in the smart device system shown in FIG. 1, the electronic device 100 that plays a control role can realize data interaction with the controlled device 99 by directly establishing a wireless connection with the router. Furthermore, the electronic device 100 can also realize data interaction with the controlled device 99 through the data link between the cloud and the router after establishing a connection with the cloud. In another implementation, in the smart device system shown in FIG. 2, the controlled device 99 can establish a wireless connection with the router through the gateway 98. The data interaction may include the mobile terminal sending control instructions to the controlled device, and the controlled device returning status information or instruction execution results to the mobile terminal. The data interaction between the mobile terminal and the controlled device can be triggered by a client installed in the mobile terminal.

Figure 1:
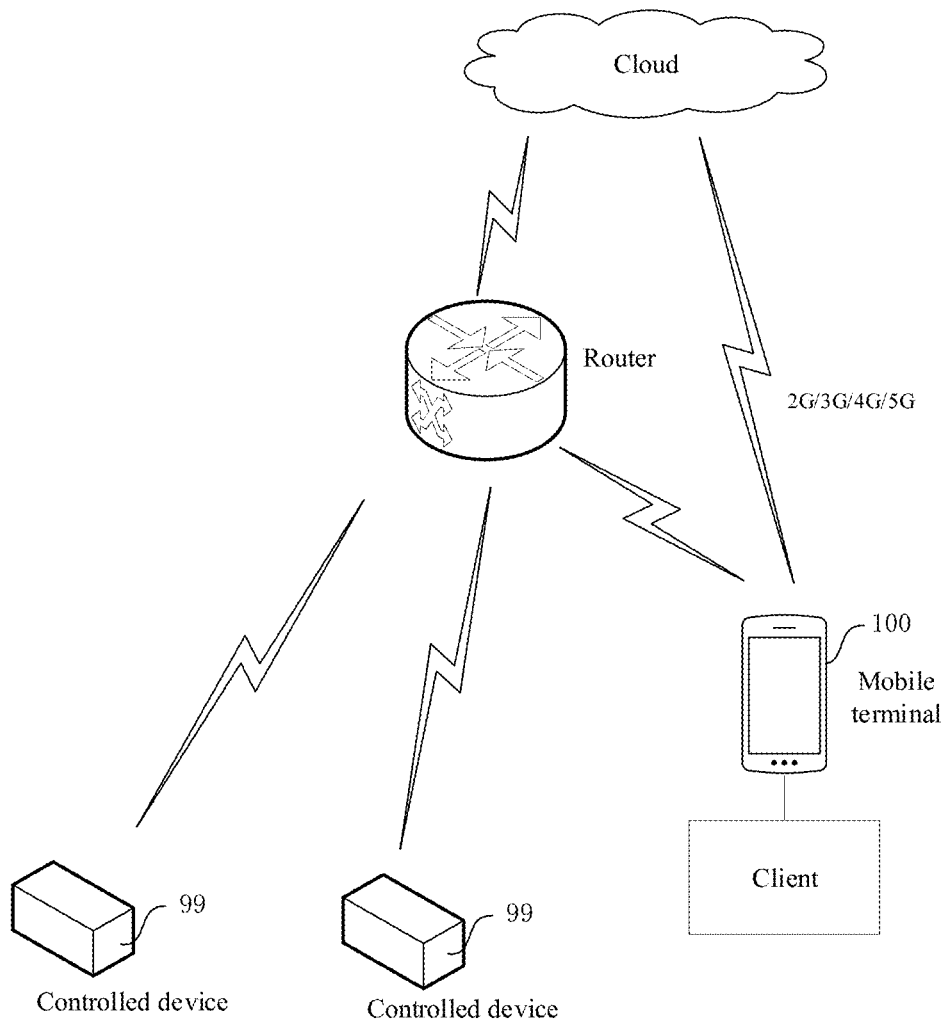
FIG. 1 shows an application network environment of a scene-operation method and apparatus according to an embodiment of the disclosure.
Figure 2:
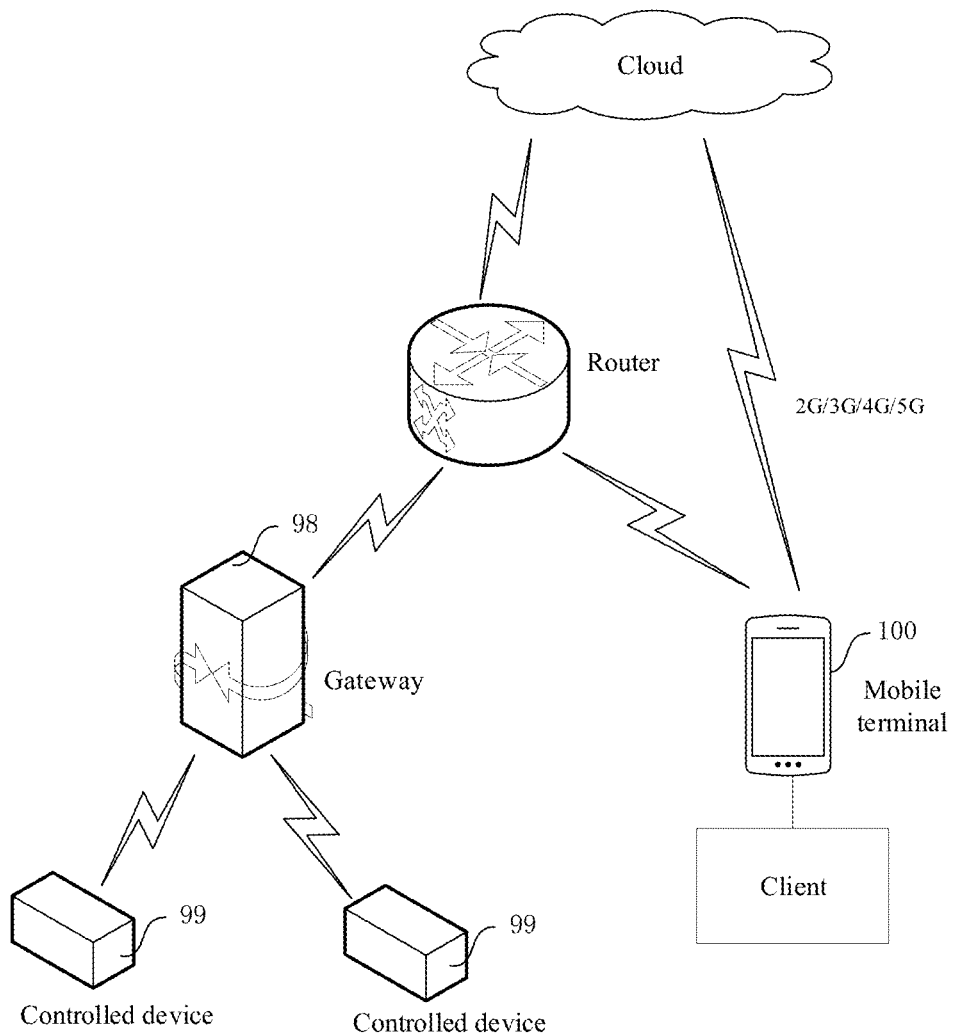
FIG. 2 shows an application network environment of a scene-operation method and apparatus according to another embodiment of the disclosure.

Specifically, a client is installed in the electronic device 100, and the client may be an application corresponding to a certain device manufacturer and can control multiple controlled devices corresponding to the device manufacturer. In addition, since the manufacturer's products include multiple devices, the client can be used as a control architecture for the multiple devices corresponding to the manufacturer, and the plug-in of each device needs to be installed for the control and interaction function of each device. As shown in FIG. 1, assume that the two controlled devices 99 are from the same device manufacturer, they can be controlled by the client. However, since the two controlled devices 99 are products of different types (for example, one is a TV of Brand x, and the other is a refrigerator of Brand x), or products of different models of the same type (for example, one is a m1-model TV of Brand x, and the other is a m2-model TV of Brand x), in order to control the two devices, the plug-ins corresponding to respective devices need to be installed separately. As shown in FIG. 1 and FIG. 2, the control plug-in 1 and the control plug-in 2 control two different controlled devices, respectively.

By setting multiple devices to perform some operations sequentially in a certain order, a scene can be constructed, that is, the meaning of the scene is that at least one smart device performs a certain series of operations when acquiring certain data as a trigger condition. By setting multiple scenes, users can operate multiple smart devices more conveniently, and the operation of smart devices is more intelligent and automatic.

However, the inventor found in research that at present, in a certain scene-trigger condition, such as home arriving, multiple scenes can be triggered, and the execution sequence for these scenes is often set to be executing according to a pre-defined time sequence. This execution mode is single, and it does not take into account the actual use of the user.

Figure 3:
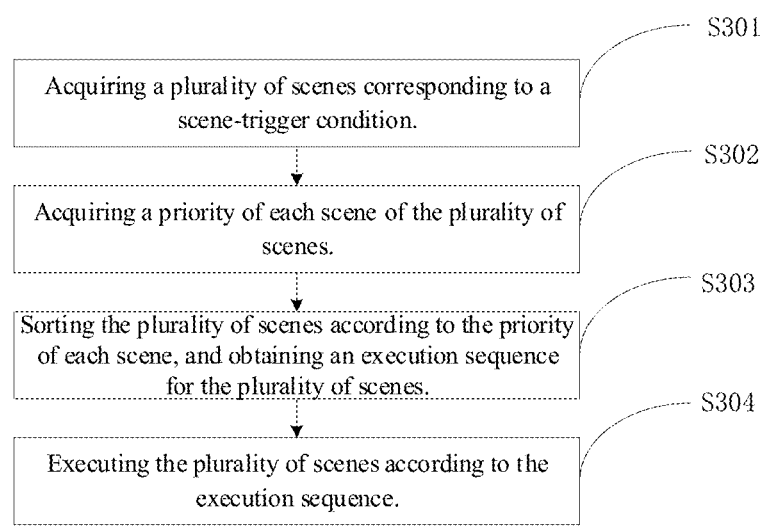
FIG. 3 shows a flowchart of a scene-operation method according to an embodiment of the disclosure.

Therefore, to overcome the above defects, the embodiments of the disclosure provide a scene-operation method, which is applied to a smart device system. The execution subject of the method may be an electronic device, a gateway or a server in the smart device system. In an implementation, the execution subject of the method in the embodiments of the disclosure is an electronic device. Specifically, as shown in FIG. 3, the method includes: S301 to S304.

S301: acquiring a plurality of scenes corresponding to a scene-trigger condition.

The scene-trigger condition is a pre-defined condition that can trigger a plurality of scenes of the smart device system. Specifically, the scene-trigger condition may be environmental information, time, the state of the smart device, the state of the home, and the like. Each scene-trigger condition corresponds to a plurality of scenes, that is, a scene correspondence is pre-stored in the electronic device or the server, and the scene correspondence includes multiple scene-trigger conditions and at least one scene corresponding to each scene-trigger condition.

When the user inputs a scene-trigger condition through the client of the electronic device, or the electronic device acquires a scene-trigger condition through other methods, the electronic device can find a plurality of scenes corresponding to the acquired scene-trigger condition according to the correspondence. Specifically, the scene-trigger condition may be triggered by the electronic device itself, or by data input from an external device. For example, the scene-trigger condition is ambient light, specifically, it may be that certain scenes are triggered in the evening.

In this way, it is possible to install multiple light sensors in the place where the user lives. The multiple light sensors send the detected light intensity to the electronic device, and the electronic device determines whether it is the evening time according to the acquired light intensity, if it is, it is determined that the scene-trigger condition is acquired, and then, the electronic device determines a plurality of scenes corresponding to the scene-trigger condition.

In addition, the scene-trigger condition may also be determined by the state of the electronic device itself. For example, the electronic device detects its own system time, if the system time is within a specified time period, it is determined that the scene-trigger condition is acquired.

It may also be that the electronic device determines whether the scene-trigger condition is acquired according to both its own state and information input by the external device. For example, taking the scene of a user arriving home as an example, a detection device is set at the door of the room, and the detection device can detect whether the door is in an open state or in a closed state. For example, the detection device may be a displacement sensor or an infrared sensor. The detection device is set at the door lock, and the collected information is different when the door lock is closed or opened, in this way, the detection device can determine whether the door lock is open, if it is determined that the door lock is open, the detection device will send a door lock open instruction to the electronic device, then the electronic device detects its own system time, if the system time is within the specified time period, it is determined that the scene-trigger condition is acquired.

Assume that there are four scenes triggered by the scene-trigger condition, namely scene A, scene B, scene C and scene D. And each scene corresponds to multiple operations.

S302: acquiring a priority of each scene of the plurality of scenes.

In an implementation, the priority of each scene may be acquired by: the electronic device displaying the plurality of scenes corresponding to the scene-trigger condition; and the user setting a priority for each scene according to the displayed scene information of the plurality of scenes, where the priorities of different scenes can be different. The scene information is description information of the scenes, and the description information of a scene includes an overview of the general functions of the scene. For example, the description information of a scene can be an explanation of multiple operations corresponding to the scene, such as "turning on the blowing mode of the air conditioner, and then opening the curtain", or "turning on the TV, and then diming the lights". The user can understand the function of a scene according to the description information of the scene, so as to set the priorities of the plurality of scenes according to their own needs.

In another implementation, the priority of each scene may be set according to the operation history of the user. For details, please refer to the subsequent embodiments.

S303: sorting the plurality of scenes according to the priority of each scene, and obtaining an execution sequence for the plurality of scenes.

After the priority of each scene is acquired, the plurality of scenes is sorted according to the priority of each scene to obtain the execution sequence. In an implementation, it may be that: the higher the priority of the scene, the higher the order of the scene in the execution sequence. In another implementation, it may also be that: the higher the priority of the scene, the lower the order of the scene in the execution sequence. It is also possible that some scenes are sorted according to their priorities while others are sorted randomly.

For example, assume the scenes corresponding to the scene-trigger condition are scene A, scene B, scene C, scene D and scene E. The priorities of the four scenes are the priority of scene A being J1, the priority of scene B being J3, the priority of scene C being J4, the priority of scene D being J2, and the priority of scene E being J5. The priorities are sorted in a descending order as: J1, J2, J3, J4, J5. In other words, scene A has the highest priority, sequentially followed by scene D, scene B, scene C and scene E.

Then, the above five scenes can be sorted according to the strategy that: the higher the priority of the scene, the higher the order of the scene in the execution sequence, and the obtained execution sequence is: scene A>scene D>scene B>scene C>scene E. In addition, the above five scenes can be sorted according to the strategy that: the higher the priority of the scene, the lower the order of the scene in the execution sequence, and the obtained execution sequence is: scene E>scene C>scene B>scene D>scene A. In addition, the above five scenes can be sorted according to the strategy of sorting some scenes according to their priorities and randomly sorting other scenes, and the obtained execution sequence is: scene A>scene D>scene E>scene B>scene C, where the first two scenes are sorted according to the strategy that: the higher the priority of the scene, the higher the order of the scene in the execution sequence, while the last three scenes are sorted randomly.

S304: executing the plurality of scenes sequentially according to the execution sequence.

Each scene includes multiple operations, and each operation corresponds to a smart device. Therefore, when executing a scene, it is necessary to send respective operation instructions to respective smart devices in the scene according to the predefined operations of the scene. Then, each smart device executes the corresponding operation according to the operation instruction.

After determining the execution sequence for the plurality of scenes, control instructions are sequentially sent to the corresponding smart devices according to the execution sequence for the scenes. In an implementation, the electronic device generates a plurality of operation instructions sequentially, according to the execution sequence for the plurality of scenes and respective operations of respective smart devices in each scene, and sends the operation instructions to the corresponding smart devices sequentially. Specifically, the sending method may be that the electronic device sends the operation instructions to the manufacturer server corresponding to the smart devices through the SDK installed in the electronic device, then the manufacturer server sends the operation instructions to the corresponding smart devices, and respective smart devices perform the corresponding operations after acquiring the operation instructions.

The electronic device sending an operation instruction to the device server through a target SDK plug-in may be specific implemented by: the electronic device acquiring the data encapsulation protocol corresponding to the device server; encapsulating the operation instruction into a data packet according to the data encapsulation protocol; and sending the data packet to the device server through the target SDK plug-in.

The data encapsulation protocol is an agreed protocol between the device server and the electronic device, and the specific encapsulation algorithm is embedded in the SDK plug-in. Specifically, the SDK plug-in includes an encapsulation interface, the encapsulation interface includes an algorithm module corresponding to the data encapsulation protocol, and the data to be sent through the interface can encapsulated according to the algorithm module. The electronic device sends the operation instruction to the SDK plug-in after acquiring the operation instruction, the SDK plug-in encapsulates the operation instruction into a data packet through the encapsulation interface, and the data packet is sent to the device server through the target SDK plug-in.

In addition, in some embodiments, when a smart device is connected to the network, the user installs the SDK plug-in corresponding to the smart device in the electronic device. Specifically, the user operates the electronic device to download the installation data of the corresponding SDK plug-in and the same is sent to the electronic device. The electronic device installs the SDK plug-in after acquiring the installation data of the SDK plug-in, and sets the corresponding smart device identification and the corresponding manufacturer identification for the SDK plug-in. After the operation instruction is acquired, the smart device identification corresponding to the operation instruction is determined, and the manufacturer identification corresponding to the smart device identification is determined, and then the SDK plug-in corresponding to the target manufacturer identification is determined according to the correspondence between SDK plug-ins in the electronic device and manufacturer identifications.

In addition, the way of sending the operation instruction may also be that the electronic device sends the operation instruction to the server corresponding to the smart device through the link address. The link address may be a URL address, and the link address corresponds to a server. Specifically, the server may be a manufacturer server corresponding to the smart device, and different device identifications correspond to different link addresses. For example, the link address is a URL address, and the format of the address is aaaa.com/123, where aaaa.com is the address corresponding to the server, and /123 is the specific storage location of the data corresponding to the device identification in the server.

In another implementation, it may also be that the electronic device sends the execution sequence for the plurality of scenes to the gateway, and the gateway sends control instructions to the corresponding smart devices sequentially according to the execution sequence for the scenes. Thus, the above SDK may be installed in the gateway. The gateway may send an operation instruction to the device server by sending the operation instruction to the target device server through the SDK plug-in, or sending the operation instruction to the target device server through the communication link between the gateway and the device server.

For example, the user clicks on the temperature increase button on the operation interface corresponding to the air conditioner, then an operation instruction for increasing the temperature is input, and the operation instruction carries the smart device identification and the temperature control parameter. For example, the current temperature is 26° C., when the user clicks the temperature increase button once, the temperature rises by 1° C., and the temperature control parameter is +1° C. The gateway sends the operation instruction to the manufacturer server, the manufacturer server parses the operation instruction to obtain the smart device identification and the temperature control parameter, and sends the operation instruction to the smart device corresponding to the smart device identification. The smart device acquires the temperature control parameter, and adjusts the temperature of the device according to the temperature control parameter, such as increasing the temperature by 1° C.

Compared with the related art, the solution provided by this application includes: acquiring a plurality of scenes corresponding to a scene-trigger condition; acquiring a priority of each scene of the plurality of scenes; sorting the plurality of scenes according to the priority of each scene, and obtaining an execution sequence for the plurality of scenes; and executing the plurality of scenes according to the execution sequence. Therefore, after determining the scenes corresponding to the scene-trigger condition, the plurality of scenes are no longer executed merely according to a preset sequence, but rather the plurality of scenes are executed according to the priorities of the scenes, thereby providing a richer scene execution strategy and increasing the diversity of scene execution.

Figure 4:
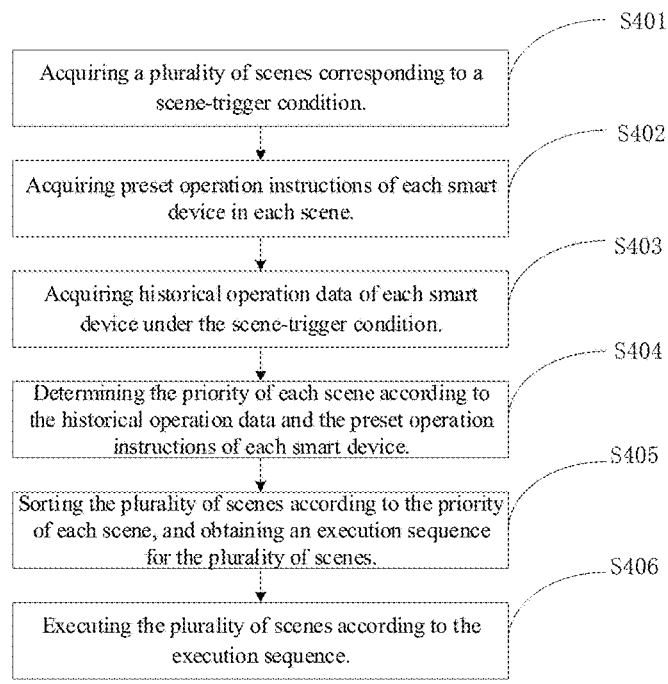
FIG. 4 shows a flowchart of a scene-operation method according to another embodiment of the disclosure.

In addition, the priority of the scene can be set according to the operation history of the user. Specifically, FIG. 4 illustrates a scene-operation method according to an embodiment of the disclosure, and the scene-operation method is applied to a smart device system. In an implementation, the execution subject of the method may be an electronic device in the smart device system. Specifically, as shown in FIG. 4, the method includes: S401 to S406.

S401: acquiring a plurality of scenes corresponding to a scene-trigger condition.

S402: acquiring, in the plurality of scenes, preset operation instructions of each smart device in each scene.

The description information of each scene is stored in the electronic device or in the server corresponding to the electronic device. The description information of a scene includes the operations of respective smart devices corresponding to the scene, so that the operation instructions of each smart device in each scene can be determined after determining the plurality of scenes corresponding to the scene-trigger condition.

In an implementation, the description information of the scenes is stored in the electronic device. The electronic device searches for the description information of the scene corresponding to each of the plurality of scenes corresponding to the trigger condition in the locally stored correspondence between scenes and description information of the scenes, and parses the description information of the scene to determine the operation instructions of multiple smart devices corresponding to the scene.

In another implementation, it may also be that the electronic device sends an information acquisition request to the server in which the correspondence between scenes and description information of the scenes is stored, and the server searches for the description information of the scene corresponding to each of the plurality of scenes corresponding to the trigger condition, parses the description information of the scene to determine the operation instructions of multiple smart devices corresponding to the scene, and returns the determined preset operation instructions of each smart device in each scene to the electronic device.

S403: acquiring historical operation data of each smart device under the scene-trigger condition.

The operations of each smart device operated by the user within a certain period of time can be recorded, and the operation record of the operated smart device can correspond to the trigger condition. For example, taking "the system time of the electronic device reaching 19:30 and the door lock being in the open state" as a scene-trigger condition, the electronic device records the user operation data of each smart device in this condition, such as turning on the heating function of the air conditioner and setting the temperature to 26°, turning on the TV, closing the curtains, turning on the water heater and setting the temperature to 45°, turning on the water dispenser, and the like. The operation data of these devices can all be recorded and corresponds to the current scene-trigger condition.

After acquiring smart devices corresponding to the scene in S402, the electronic device can search for the operation data corresponding to the scene-trigger condition in the above recorded data, and search for the historical operation data corresponding to each smart device.

S404: determining the priority of each scene according to the historical operation data and the preset operation instructions of each smart device.

The historical operation data can reflect the operation habit of the user in the current scene-trigger condition. the implementation of determining the priority of each scene according to the historical operation data and the preset operation instructions of each smart device may be determining the usage status of each smart device according to the historical operation data of each smart device. For example, if the user repeatedly operates the air conditioner in the trigger condition of arriving home, and the number of operations corresponding to the air conditioner is at most and the operation time is long enough, the priority of the scene including the operation of the air conditioner in the plurality of scenes corresponding to the current scene-trigger condition can be set to be the highest, and then the priorities of other scenes are determined according to the number or duration of the user operations on other devices.

In another implementation, the specific implementation of determining the priority of each scene according to the historical operation data and the preset operation instructions of each smart device may be: acquiring an operation scheme of a user on each smart device under the scene-trigger condition according to the historical operation data of each smart device; matching the operation scheme with the preset operation instructions of each smart device in each scene, and obtaining similarity between each scene and the operation scheme; and determining the priority of each scene according to the similarity of each scene.

After acquiring the historical operation data of each smart device in each of the plurality of scenes corresponding to the scene-trigger condition, the electronic device counts the operation instruction and operation time point of the user on each smart device under the scene-trigger condition, so as to determine the operation scheme under the scene-trigger condition. The operation scheme includes the operation instructions and operation time sequence of each smart device. For example, the operation scheme includes turning on the main light in the living room, turning on the heating mode of the air conditioner and setting the temperature to 26°, turning on the TV, turning on the water dispenser, and drawing the curtain. In addition, the operation instructions of the multiple smart devices in the above operation scheme are executed in a certain order.

In the plurality of scenes corresponding to the scene-trigger condition, each scene includes the operation instructions of respective smart devices. For example, the plurality of scenes include scene A, scene B and scene C. The operations in scene A include operation 1 and operation 2, the operations in scene B include operation 3 and operation 4, and the operations in scene C include operation 5 and operation 6.

The operation scheme is matched with the preset operation instructions of each smart device in each scene to obtain the similarity between each scene and the operation scheme. In an implementation, a similarity score may be set for each scene, and each scene may be assigned a score according to the operation scheme and the operation instructions of each scene. Specifically, it may be that the scene is assigned a first score if the smart device corresponding to the operation instruction appears in the operation scheme, if it does not appear, no points will be assigned. In addition, if the order of the operation of the corresponding smart device is higher in the operation scheme, the more points will be assigned. In this way, the score of each scene can be determined, and the higher the score, the higher the similarity.

In addition, if the scores of two scenes are the same, additional points can be assigned according to the number of operation instructions in each scene. Specifically, the more operation instructions in the scene, the higher the additional score may be assigned, so that the scene with more operation instructions can be executed first, which enables the user to preferentially operate more devices, thereby quickly entering a comfortable environment. In addition, it may also be that the fewer operation instructions in the scene, the higher the additional points assigned, so that the scene can be executed quickly. For example, scene A includes operation 1, operation 2, and operation 3, scene B includes operation 4 and operation 5, and the operation scheme acquired according to the historical operation data includes operation 11 and operation 22, where operation 11 and operation 22 respectively correspond to operation 2 and operation 3 in scene A, and operation 11 and operation 22 respectively correspond to operation 4 and operation 5 in scene B, thus the scores of scene A and scene B are the same. Then, since scene A further includes operation 3, scene A is assigned additional points, which causes the score of scene A being higher than that of scene B. In other words, the similarity of scene A is higher than the similarity of scene B.

The priority of the scene is determined according to the similarity of the scene. In an implementation, the higher the similarity of the scene, the higher the priority. For example, the plurality of scenes determined by the current scene-trigger condition are scene A, scene B, scene C, scene D and scene E. The five scenes are ranked in the order of similarity from largest to smallest as: scene A>scene D>scene B>scene C>scene E, then the priorities of the five scenes is determined as: scene A>scene D>scene B>scene C>scene E.

S405: sorting the plurality of scenes according to the priority of each scene, and obtaining an execution sequence for the plurality of scenes.

S406: executing the plurality of scenes sequentially according to the execution sequence.

For parts that are not described in detail in the above steps, reference may be made to the foregoing embodiments, and details are not repeated herein.

Figure 5:
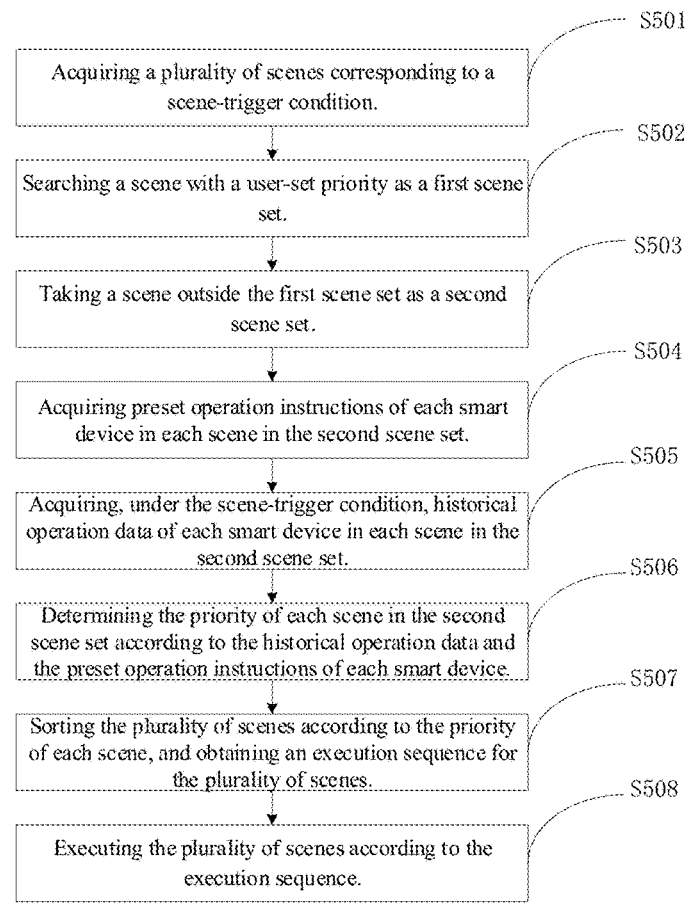
FIG. 5 shows a flowchart of a scene-operation method according to a further embodiment of the disclosure.

In addition, the determination of the priority mentioned above can also be set by the user, or the user sets the priorities of some scenes, and the priorities of other scenes are determined according to the above method. Specifically, FIG. 5 illustrates a scene-operation method according to an embodiment of the disclosure, and the scene-operation method is applied to a smart device system. In an implementation, the execution subject of the method may be an electronic device in the smart device system. Specifically, as shown in FIG. 5, the method includes: S501 to S508.

S501: acquiring a plurality of scenes corresponding to a scene-trigger condition.

S502: searching, from the plurality of scenes, at least one scene with a user-set priority as a first scene set.

After acquiring the plurality of scenes corresponding to the current scene-trigger condition, the electronic device finds whether there is at least one scene with a user-set priority in the plurality of scenes, if so, the electronic device acquires the at least one scene with a user-set priority, and the corresponding at least one priority.

In an implementation, when the device accesses the network, the user sets a priority for the scene corresponding to the device, a scene-trigger condition corresponding to the scene is also set. For example, the user has set a plurality of scenes for arriving home, and set the priorities for several of them, so that in any situation, the several scenes set by the user is always executed according to the set priorities in the plurality of scenes triggered by arriving home.

Figure 6:
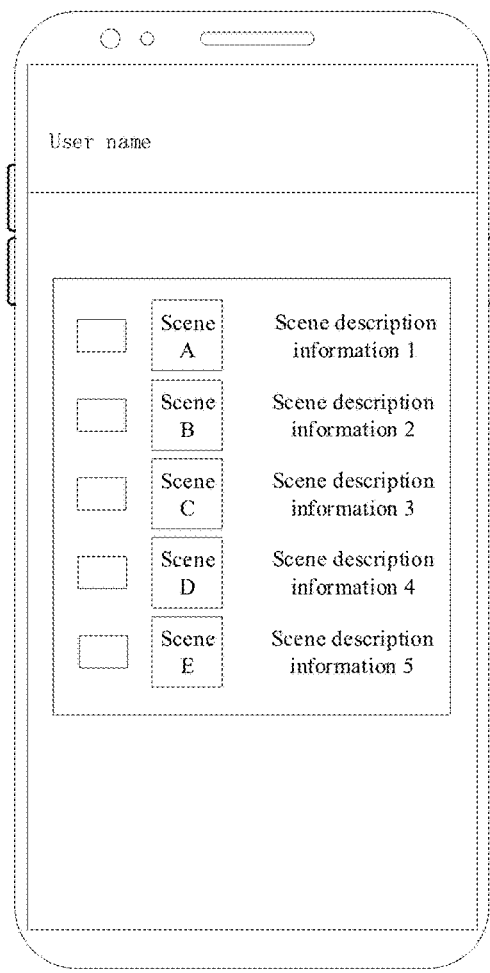
FIG. 6 shows a schematic diagram of a setting interface of the scene priority proposed in an embodiment of the disclosure.

In another implementation, after determining the plurality of scenes corresponding to the current scene-trigger condition, that is, before acquiring the priority of each scene, the electronic device displays scene information corresponding to each scene, and acquires the user-set priority, set by a user based on the displayed scene information, of the at least one scene. Specifically, the scenes are displayed, and the user-set priority set by a user according to the displayed scenes are acquired. Specifically, the electronic device may acquire the description information of the scenes corresponding to respective scenes. The description information of the scene may be pre-stored in the electronic device and used to describe functions and a series of operations of the scene. As shown in FIG. 6, the scene priority setting interface is displayed in the designated interface of the client of the electronic device. The scene priority setting interface may be a prompt window in which the identifier of each scene and the description information corresponding to each scene are displayed. Each scene identifier corresponds to a setting button, the setting button can correspond to a drop-down menu, and the drop-down menu corresponds to multiple priority identifier. The user can click on the drop-down menu and to select an identifier from the displayed multiple priority identifiers.

In addition, the drop-down menu may not be displayed and replaced by a selection button. The user selects scene identifiers in a certain order on the priority setting interface, and then the electronic device can record the selection order of the user, and set priorities for the user according to the order.

In the plurality of scenes corresponding to the current scene-trigger condition, after the at least one scene with a user-set priority is found, the found at least one scene is regarded as the first scene set. For example, the plurality of scenes corresponding to the current scene-trigger condition are scene A, scene B, scene C, scene D and scene E, and the at least one scene with a user-set priority includes scene A and scene B, then the first scene set includes scene A and scene B.

S503: taking, from the plurality of scenes, other scenes outside the first scene set as a second scene set.

For example, for scene A, scene B, scene C, scene D and scene E mentioned above, the at least one scene with a user-set priority includes scene A and scene B, then the first scene set includes scene A and scene B, and the second scene set includes scene C, scene D and scene E.

S504: acquiring preset operation instructions of each smart device in each scene in the second scene set.

S505: acquiring, under the scene-trigger condition, historical operation data of each smart device in each scene in the second scene set.

S506: determining the priority of each scene in the second scene set according to the historical operation data and the preset operation instructions of each smart device.

For setting the priorities of multiple scenes in the second scene set, reference may be made to the specific implementations of S402 to S404 mentioned above, which will not be repeated here.

The priority of each scene in the first scene set is greater than the priority of each scene in the second scene set. In other words, the priorities set by the user are higher than the priorities determined by historical operation data, thereby better improving the user experience. For example, as mentioned above, first scene set includes scene A and scene B, and the second scene set includes scene C, scene D and scene E. The user has set the priority of scene A to be greater than that of scene B, and by comparing the historical operation data of scene C, scene D and scene E in the current scene-trigger condition, the priorities of the three scenes are determined as scene D, scene C and scene E in descending order. The priorities of scene A and scene B are greater than the priorities of scene C, scene D and scene E, then the priority order of all scenes is obtained as: scene A>scene B>scene D>scene C>scene E.

S507: sorting the plurality of scenes according to the priority of each scene, and obtaining an execution sequence for the plurality of scenes.

S508: executing the plurality of scenes sequentially according to the execution sequence.

For parts that are not described in detail in the above steps, reference may be made to the foregoing embodiments, and details are not repeated herein.

Figure 7:
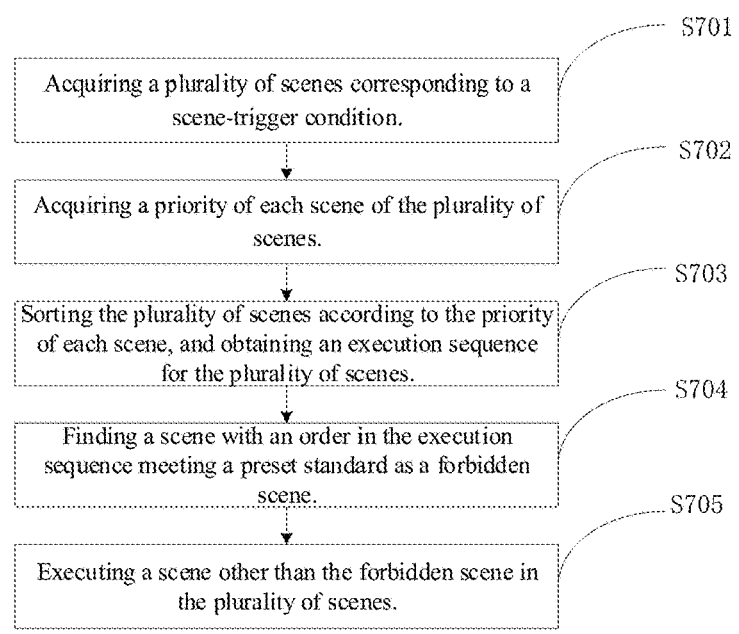
FIG. 7 shows a flowchart of a scene-operation method according to further another embodiment of the disclosure.

In addition, considering that some scenes may not need to be executed, executing those scenes wastes resources, FIG. 7 illustrates a scene-operation method according to an embodiment of the disclosure, and the scene-operation method is applied to a smart device system. In an implementation, the execution subject of the method may be an electronic device in the smart device system. Specifically, as shown in FIG. 7, the method includes: S701 to S705.

S701: acquiring a plurality of scenes corresponding to a scene-trigger condition.

S702: acquiring a priority of each scene of the plurality of scenes.

S703: sorting the plurality of scenes according to the priority of each scene, and obtaining an execution sequence for the plurality of scenes.

S704: finding at least one scene with an order in the execution sequence meeting a preset standard as at least one forbidden scene.

Specifically, the preset standard is a standard set by the user according to requirements, so that scenes that meet the preset standard can be screened out from the plurality of scenes. Specifically, the preset standard may correspond to the current scene-trigger condition, and the preset standard may be set according to the operation instructions in the scenes. For example, if the user does not like to operate the curtain under the scene-trigger condition of arriving home, the preset standard may be a scene that includes the operation of the curtain. That is, in the plurality of scenes, at least one scene including the operation of the curtain is regarded as the at least one forbidden scene.

In addition, the at least one forbidden scene may also be set according to the execution sequence of the scenes. Specifically, at least one scene ranked in a certain interval of the execution sequence may be regarded as the at least one forbidden scene. In an implementation, the last N scenes in the execution sequence are regarded as the at least one forbidden scene, where N is a positive integer greater than 1. The lower-ranked scenes can represent scenes that are not so urgent in execution. For example, the higher the priority of the scene, the higher the order of the scene in the execution sequence, the lower the order of the scene in the execution sequence, the lower the priority of the scene, and the lower priority indicates that the execution of the scene is not urgent enough, so it may not be executed.

In addition, the priority of the scene is determined according to the similarity, as mentioned above. The higher the similarity, the higher the priority of the scene, and the higher the priority of the scene, the higher the order of the scene in the execution sequence. Therefore, the determined similarities of the last N scenes in execution sequence are relatively low, that is, the last N scenes in the execution sequence are even less similar to the historical operation data of the user in the current scene-trigger condition, that is, less matched with the user operation behavior, it means that the user is not interested in the content of the scene, and it may not be executed.

S705: executing, according to the execution sequence, scenes other than the at least one forbidden scene in the plurality of scenes sequentially.

The determined at least one forbidden scene is not executed, and scenes other than the at least one forbidden scene are executed, thereby saving resources and better meeting the needs of the user.

For parts that are not described in detail in the above steps, reference may be made to the foregoing embodiments, and details are not repeated herein.

Figure 8:
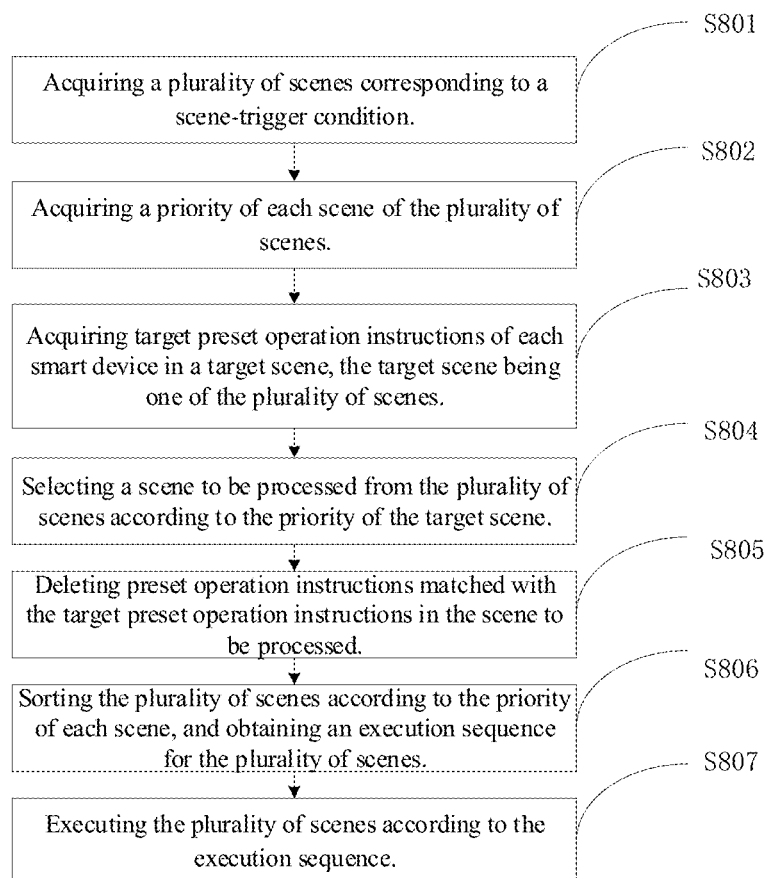
FIG. 8 shows a flowchart of a scene-operation method according to still further another embodiment of the disclosure.

In addition, considering that the same operation may be included in the plurality of scenes, deduplication may be performed on respective operations in the scenes to avoid repeated execution of the operation. FIG. 8 illustrates a scene-operation method according to an embodiment of the disclosure, and the scene-operation method is applied to a smart device system. In an implementation, the execution subject of the method may be an electronic device in the smart device system. Specifically, as shown in FIG. 8, the method includes: S801 to S807.

S801: acquiring a plurality of scenes corresponding to a scene-trigger condition.

S802: acquiring a priority of each scene of the plurality of scenes.

S803: acquiring target preset operation instructions of each smart device in a target scene, the target scene being one of the plurality of scenes.

In an implementation, the plurality of scenes may be sorted to obtain the deduplication order of the plurality of scenes, and then the deduplication operation is performed on the plurality of scenes sequentially according to the deduplication order. The target scene may be a scene acquired sequentially according to the deduplication order. For example, the plurality of scenes are scene A, scene B, scene C, scene D and scene E, and the determined deduplication order is: scene A>scene B>scene D>scene C>scene E. It should be noted that the deduplication order may be the same as the priority order of the scenes, that is, the higher the priority of the scene, the higher the order of the scene in the deduplication order. Then the target scenes are sequentially determined as: scene A, scene B, scene D, scene C and scene E.

Then, each preset operation instruction in the target scene is acquired as the target preset operation instruction. The preset operation instruction is an operation instruction preset for the scene, but the operation instruction may not be executed yet this time.

S804: selecting at least one scene to be processed from the plurality of scenes according to the priority of the target scene.

The purpose of setting priorities is to enable the scenes to be executed according to the set priorities, that is, if a certain operation instruction has been executed in a previously executed scene, it is not necessary to execute this operation instruction in subsequently executed scenes. Therefore, it is necessary to select the at least one scene to be processed from the plurality of scenes according to the currently determined target scene and the priority of the target scene.

In an implementation, at least one scene with priority lower than the priority of the target scene may be used as the at least one scene to be processed, or at least one scene with priority higher than the priority of the target scene may be used as the at least one scene to be processed. Specifically, the implementation of determining at least one scene to be processed may be related to the execution sequence for the plurality of scenes, if the execution sequence for the scenes is that: the higher the priority of the scene, the higher the order of the scene in the execution sequence, then at least one scene with priority lower than the priority of the target scene in the plurality of scenes is regarded as the at least one scene to be processed. If the execution sequence of the scenes is that: the lower the priority of the scene, the higher the order of the scene in the execution sequence, then at least one scene with priority higher than the priority of the target scene in the plurality of scenes is regarded as the at least one scene to be processed.

In the embodiment of the disclosure, the implementation of selecting at least one scene to be processed from the plurality of scenes according to the priority of the target scene may be: taking, in the plurality of scenes, at least one scene with priority lower than the priority of the target scene as the at least one scene to be processed.

For example, for scene A, scene B, scene C, scene D and scene E, the priority order is determined as: scene A>scene B>scene D>scene C>scene E, if the current target scene is scene A, the determined at least one scene to be processed includes scene B, scene C, scene D and scene E.

S805: deleting preset operation instructions matched with the target preset operation instructions in the at least one scene to be processed.

The matching method of matching all target preset operation instructions in the target scene with each preset operation instruction in the at least one scene to be processed may be: taking the operation instructions, with the identifiers of corresponding smart devices to be same, as the matched operation instructions. It may also be that the operation instructions executed at the same time are regarded as the matched operation instructions.

In the embodiment of the disclosure, the specific implementation of deleting preset operation instructions matched with the target preset operation instructions in the at least one scene to be processed may be: taking, in the at least one scene to be processed, an operation instruction corresponding to a smart device the same with one of the target preset operation instructions corresponds to as an operation instruction to be deleted; and deleting the operation instruction to be deleted in the at least one scene to be processed.

Taking scene A, scene B, scene C, scene D and scene E mentioned above as an example, the target scene is scene A, the at least one scene to be processed includes scene B, scene C, scene D and scene E. Assuming that scene A includes operation 1 and operation 2, and scene B includes operation 3 and operation 4, the smart device corresponding to operation 1 and operation 3 is an air conditioner, the device corresponding to operation 2 is a TV, and the device corresponding to operation 4 is a washing machine, then operation 3 is deleted from scene B, and the operation corresponding to scene B becomes operation 4, that is, the redundant operation is deleted.

In addition, if two operation instructions correspond to the same smart device, but the corresponding operation parameters are different, then both operation instructions can be executed. For example, operation 1 corresponds to an air conditioner, and includes turning on the heating mode of the air conditioner and setting the temperature to 30°, operation 3 also corresponds to the air conditioner, and includes turning on the heating mode of the air conditioner and setting the temperature to 26°, the parameter information corresponding to operation 1 and operation 3 are different, it is possible to perform both operations. Therefore, the specific implementation of deleting preset operation instructions matched with the target preset operation instructions in the at least one scene to be processed may be: taking, in the at least one scene to be processed, an operation instruction corresponding to a smart device the same with one of the target preset operation instructions corresponds to as an operation instruction to be deleted; and deleting the operation instruction to be deleted in the at least one scene to be processed, in response to parameter information of the operation instruction to be deleted matching parameter information of the corresponding one of the target preset operation instructions.

The meaning of parameter information of the operation instruction to be deleted matching parameter information of the corresponding one of the target preset operation instructions may be that the parameter information of the operation instruction to be deleted is the same as the parameter information of the target preset operation instruction, it may also be that there is a certain difference between the parameter information of the operation instruction to be deleted and the parameter information of the target preset operation instruction, and the difference is within a certain range. The specific implementation of parameter information of the operation instruction to be deleted matching parameter information of the corresponding one of the target preset operation instructions may be: a difference between the parameter information of the operation instruction to be deleted and the parameter information of the corresponding one of the target preset operation instructions being less than a predetermined value.

The designated value can be set by the user according to requirements, or can be set according to the operated smart device. For example, as mentioned above, operation 1 in scene A corresponds to an air conditioner, and includes turning on the heating mode of the air conditioner and setting the temperature to 30°, operation 3 in scene B also corresponds to the air conditioner, and includes turning on the heating mode of the air conditioner and setting the temperature to 26°. The parameter information corresponding to operation 1 is 30°, the parameter information corresponding to operation 3 is 26°. If the predetermined value is set to 2°, since the difference between the parameter information of the two is 4°, that is, less than 2°, it can be determined that operation 1 and operation 3 are not matched with each other.

Therefore, through the above operations, in subsequently executed scenes, the operation matched with the preset operation in a previously executed scene is no longer executed, which can save resources.

In addition, it should be noted that if all operation instructions in a certain scene are deleted, it may not be necessary to execute the scene, and the scene may be regarded as the forbidden scene as mentioned above.

S806: sorting the plurality of scenes according to the priority of each scene, and obtaining an execution sequence for the plurality of scenes.

S807: executing the plurality of scenes sequentially according to the execution sequence.

Therefore, by dynamically sorting the priorities the scenes according to the historical records operated by the user and the historical states of the devices, the scene selection method of the user can be improved, scheduling conflicts in multiple scenes can be resolved, thereby achieving intelligentized scene scheduling. And the problem of repeatedly setting the status attribute of a device in multiple scenes can be avoided. For example, both scene A and scene B include the operation of setting temperature of the air conditioner. If the priority of scene B is lower than that of scene A, then the operation of setting temperature in scene B can be discarded for optimization. The "intelligentized scene scheduling" refers to a prediction of user behavior based on the historical record of operations that the user tends to perform on a device in the current external condition, so as to determine the priorities of the scenes and achieve a more reasonable execution rule.

For parts that are not described in detail in the above steps, reference may be made to the foregoing embodiments, and details are not repeated herein.

Figure 9:
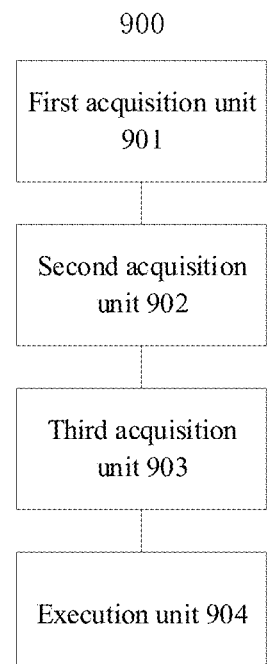
FIG. 9 shows a block diagram of a scene-operation apparatus according to an embodiment of the disclosure.

FIG. 9 illustrates a structural block diagram of a scene-operation apparatus according to an embodiment of the disclosure. The apparatus may include: a first acquisition unit 901, a second acquisition unit 902, a third acquisition unit 903, and an execution unit 904.

The first acquisition unit 901 is configured to acquire a plurality of scenes corresponding to a scene-trigger condition.

The second acquisition unit 902 is configured to acquire a priority of each scene of the plurality of scenes.

Figure 10:
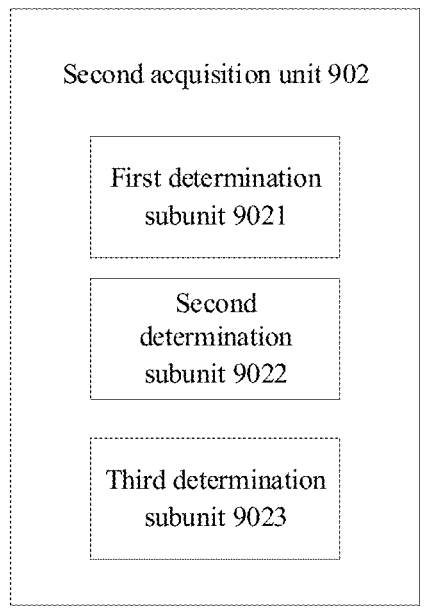
FIG. 10 shows a block diagram of a second acquisition unit in a scene-operation apparatus according to an embodiment of the disclosure.

In an implementation, as shown in FIG. 10, the second acquisition unit 902 includes: a first determination subunit 9021, a second determination subunit 9022, and a third determination subunit 9023.

The first determination subunit 9021 is configured to acquire, in the plurality of scenes, preset operation instructions of each smart device in each scene.

The second determination subunit 9022 is configured to acquire historical operation data of each smart device under the scene-trigger condition.

The third determination subunit 9023 is configured to determine the priority of each scene according to the historical operation data and the preset operation instructions of each smart device.

Figure 11:
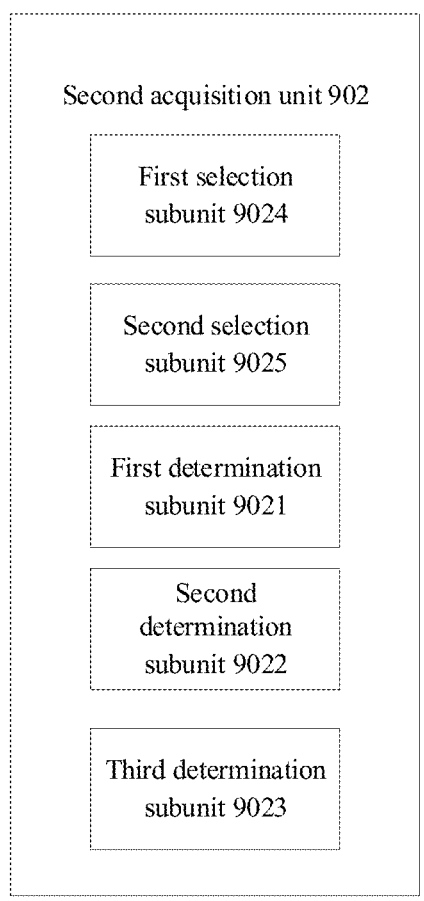
FIG. 11 shows a block diagram of a second acquisition unit in a scene-operation apparatus according to another embodiment of the disclosure.

In another implementation, as shown in FIG. 11, the second acquisition unit 902 may further include: a first selection subunit 9024 and a second selection subunit 9025.

The first selection subunit 9024 is configured to search at least one scene with a user-set priority from the plurality of scenes as a first scene set.

The second selection subunit 9025 is configured to take, from the plurality of scenes, other scenes outside the first scene set as a second scene set.

The first determination subunit 9021 is further configured to acquire preset operation instructions of each smart device in each scene in the second scene set.

The third determination subunit 9023 is further configured to: acquire an operation scheme of a user on each smart device under the scene-trigger condition, according to the historical operation data of each smart device; match the operation scheme with the preset operation instructions of each smart device in each scene, and obtain similarity between each scene and the operation scheme; and determine the priority of each scene according to the similarity of each scene.

The apparatus further includes a priority setting unit. The priority setting unit is configured to: display scene information corresponding to each scene; and acquire the user-set priority, set by a user based on the displayed scene information, of the at least one scene.

The third acquisition unit 903 is configured to sort the plurality of scenes according to the priority of each scene and obtain an execution sequence for the plurality of scenes.

The execution unit 904 is configured to execute the plurality of scenes sequentially according to the execution sequence.

The apparatus also includes a forbidden unit.

The forbidden unit is configured to: find at least one scene with an order in the execution sequence meeting a preset standard as at least one forbidden scene; and execute, according to the execution sequence, scenes other than the at least one forbidden scene in the plurality of scenes sequentially. Specifically, the last N scenes in the execution sequence are regarded as the at least one forbidden scene, N is a positive integer greater than 1.

The apparatus also includes a deduplication unit.

The deduplication unit is configured to: acquire target preset operation instructions of each smart device in a target scene, the target scene being one of the plurality of scenes; select at least one scene to be processed from the plurality of scenes according to the priority of the target scene; and delete preset operation instructions matched with the target preset operation instructions in the at least one scene to be processed. Specifically, at least one scene with priority lower than the priority of the target scene in the plurality of scenes is regarded as the at least one scene to be processed. The specifical implementation of deleting preset operation instructions matched with the target preset operation instructions in the at least one scene to be processed is: taking, in the at least one scene to be processed, an operation instruction corresponding to a smart device the same with one of the target preset operation instructions corresponds to as an operation instruction to be deleted; and deleting the operation instruction to be deleted in the at least one scene to be processed, in response to parameter information of the operation instruction to be deleted matching parameter information of the corresponding one of the target preset operation instructions. Wherein parameter information of the operation instruction to be deleted matching parameter information of the corresponding one of the target preset operation instructions is that the difference between the parameter information of the operation instruction to be deleted and the parameter information of the corresponding one of the target preset operation instructions is less than a predetermined value.

Those of ordinary skill in the art can clearly understand that, for the convenience and conciseness of the description, the specific working process of the apparatus and module described above can refer to the corresponding process in the foregoing method embodiment, which will not be repeated here.

In the several embodiments provided in the disclosure, the coupling of modules may be electrical coupling, mechanical coupling, or other forms of coupling.

In addition, the functional modules in the various embodiments of the disclosure may be integrated to one processing module, or each module may exist alone physically, or two or more modules may be integrated into one module. The integrated module can be implemented in the form of hardware or software functional module.

Figure 12:
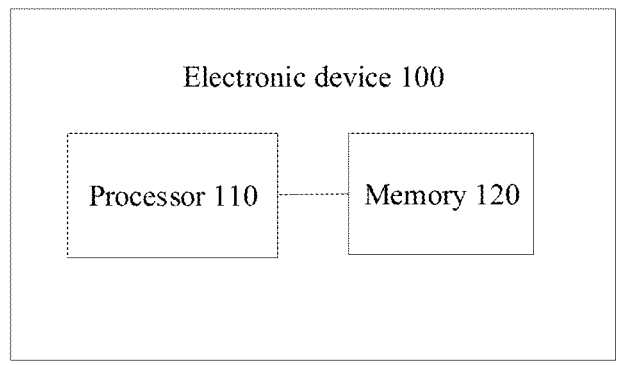
FIG. 12 shows a block diagram of an electronic device according to an embodiment of the disclosure.

FIG. 12 illustrates a structural block diagram of an electronic device according to an embodiment of the disclosure. The electronic device 100 may be an electronic device capable of running application programs, such as a smart phone, a tablet computer, or an e-book. The electronic device 100 in the disclosure may include one or more of the following components: a processor 110, a memory 120, and one or more application programs. The one or more application programs may be stored in the memory 120, and one or more application programs, when executed by the one or more processors 110, are configured to implement the method in the above method embodiment.

The processor 110 may include one or more processing cores. The processor 110 uses various interfaces and lines to connect various parts of the entire electronic device 100, and executes various functions of the electronic device 100 and processes data, by running or executing the instructions, programs, code sets, or instruction sets stored in the memory 120 and calling data stored in the memory 120. Optionally, the processor 110 may be implemented in at least one hardware form of digital signal processing (DSP), field-programmable gate array (FPGA), and programmable logic array (PLA). The processor 110 may be integrated with one or more of a central processing unit (CPU), a graphics processing unit (GPU), and a modem. The CPU mainly processes the operating system, user interface, and application programs. The GPU is configured for rendering and drawing of display content. The modem is configured for processing wireless communication. It can be understood that the modem may also not be integrated into the processor 110, but be implemented by a communication chip alone.

The memory 120 may include a random-access memory (RAM), and may also include a read-only memory (ROM). The memory 120 may be configured to store instructions, programs, codes, code sets, or instruction sets. The memory 120 may include a program storage area and a data storage area. The program storage area may store instructions for implementing the operating system, instructions for implementing at least one function (such as touch function, sound playback function, image playback function, etc.), and instructions for implementing the above method embodiments, etc. The data storage area may store data created by the electronic device 100 during use (such as address book, audio and video data, and chat record data).

Figure 13:
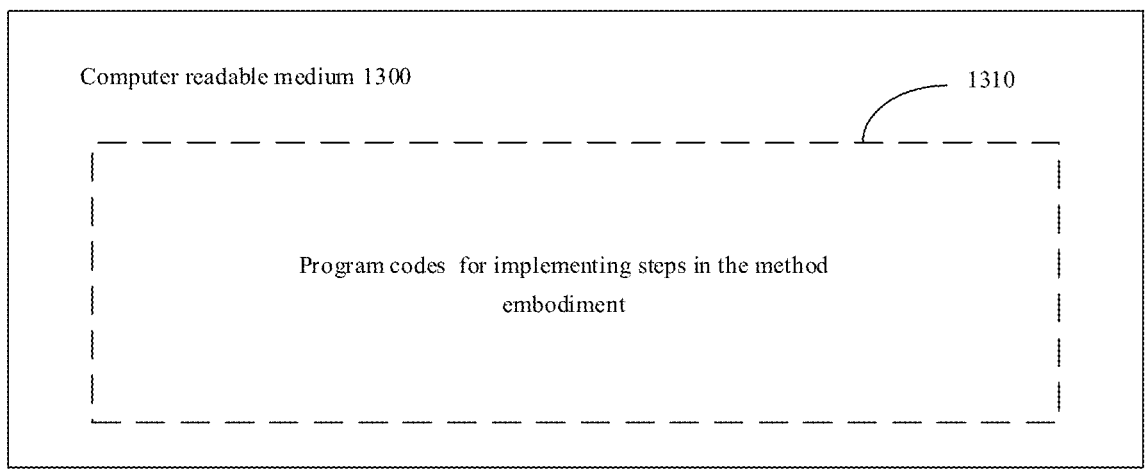
FIG. 13 shows a storage medium for storing or carrying program codes configured for implementing the scene-operation methods according to the embodiments of the disclosure, according to an embodiment of the disclosure.

FIG. 13 illustrates a structural block diagram of a non-transitory computer readable storage medium according to an embodiment of the disclosure. The computer readable medium 1300 stores program codes which, when called by a processor, cause the processor to perform the method in the above method embodiment.

The computer readable storage medium 1300 may be an electronic memory such as flash memory, Electrically Erasable Programmable Read Only Memory (EEPROM), EPROM, hard disk, or ROM. Optionally, the computer readable storage medium 1300 includes a non-transitory computer readable storage medium. The computer readable storage medium 1300 has storage space for the program codes 1310 configured for implementing any method steps in the above methods. These program codes can be read from or written into one or more computer program products. The program codes 1310 may be compressed in an appropriate form.

It should be noted that the above embodiments are only used to illustrate the technical solutions of the disclosure, but not intended to limit the disclosure. Although the disclosure has been described in detail with reference to the foregoing embodiments, it should understand that those of ordinary skill in the art can still modify the technical solutions recorded in the foregoing embodiments, or equivalently replace some of the technical features. These modifications or replacements do not make the essence of the corresponding technical solutions deviate from the spirit and scope of the technical solutions of the embodiments of the disclosure.

What is claimed is:

1. A scene-operation method, comprising:
acquiring, from a scene correspondence, a plurality of scenes corresponding to a scene-trigger condition, wherein each scene of the plurality of scenes comprises multiple operations corresponding to respective smart devices in the scene, and the method configures an electronic device to realize data interaction with the smart devices as controlled devices;
wherein the scene correspondence is pre-stored, and comprises a plurality of scene-trigger conditions and at least one scene corresponding to each of the plurality of scene-trigger conditions;
acquiring a priority of each scene of the plurality of scenes, wherein the acquiring a priority of each scene of the plurality of scenes comprises:
acquiring, from a correspondence between the plurality of scenes and description information of the plurality of scenes, preset operation instructions of each smart device in each scene, comprising:
searching the description information of the scene corresponding to each of the plurality of scenes corresponding to the scene-trigger condition in the correspondence between the plurality of scenes and description information of the plurality of scenes;
parsing the description information of the scene to determine the preset operation instructions of each smart device corresponding to the scene;
wherein the description information of each scene comprises multiple operations corresponding to respective smart devices in the scene;
acquiring historical operation data of each smart device under the scene-trigger condition; and
determining the priority of each scene according to the historical operation data and the preset operation instructions of each smart device;
sorting the plurality of scenes according to the priority of each scene, and obtaining an execution sequence for the plurality of scenes;

finding a scene with an order in the execution sequence meeting a preset standard as a forbidden scene; and executing the plurality of scenes according to the execution sequence, wherein the executing the plurality of scenes according to the execution sequence comprises:

sending operation instructions, when executing each scene, to the respective smart devices in the scene.

2. The method as claimed in claim 1, wherein the acquiring a priority of each scene of the plurality of scenes comprises:

searching a scene with a user-set priority as a first scene set;

taking a scene outside the first scene set as a second scene set;

acquiring preset operation instructions of each smart device in each scene in the second scene set;

acquiring, under the scene-trigger condition, historical operation data of each smart device in each scene in the second scene set; and determining the priority of each scene in the second scene set according to the historical operation data and the preset operation instructions of each smart device, wherein the priority of each scene in the first scene set is greater than the priority of each scene in the second scene set.

3. The method as claimed in claim 2, further comprising: before acquiring a priority of each scene of the plurality of scenes, displaying scene information corresponding to each scene; and acquiring the user-set priority based on the displayed scene information.

4. The method as claimed in claim 1, wherein the determining the priority of each scene according to the historical operation data and the preset operation instructions of each smart device comprises:

acquiring an operation scheme of a user on each smart device under the scene-trigger condition according to the historical operation data of each smart device;

matching the operation scheme with the preset operation instructions of each smart device in each scene, and obtaining similarity between each scene and the operation scheme; and determining the priority of each scene according to the similarity of each scene;

wherein the acquiring an operation scheme of a user on each smart device under the scene-trigger condition according to the historical operation data of each smart device comprises:

counting an operation instruction and an operation time point of the user on each smart device under the scene-trigger condition after acquiring the historical operation data of each smart device, to determine the operation scheme;

wherein the matching the operation scheme with the preset operation instructions of each smart device in each scene, and obtaining similarity between each scene and the operation scheme comprises:

assigning a score when the preset operation instructions of each smart device in each scene appears in the operation scheme;

assigning no point when the preset operation instructions of each smart device in each scene do not appear in the operation scheme;

determining the score of each scene to thereby obtaining the similarity between each scene and the operation scheme, and the higher the score, the higher the similarity.

5. The method as claimed in claim 1, wherein the executing the plurality of scenes according to the execution sequence comprises:

executing a scene other than the forbidden scene in the plurality of scenes.

6. The method as claimed in claim 5, wherein the finding a scene with an order in the execution sequence meeting a preset standard as a forbidden scene comprises:

taking last N scenes in the execution sequence as the forbidden scene, N being a positive integer greater than 1.

7. The method as claimed in claim 1, further comprising: before sorting the plurality of scenes according to the priority of each scene, acquiring target preset operation instructions of each smart device in a target scene, the target scene being one of the plurality of scenes;

selecting a scene to be processed from the plurality of scenes according to the priority of the target scene; and deleting preset operation instructions matched with the target preset operation instructions in the scene to be processed.

8. The method as claimed in claim 7, wherein the selecting a scene to be processed from the plurality of scenes according to the priority of the target scene comprises:

taking a scene with priority lower than the priority of the target scene as the scene to be processed.

9. The method as claimed in claim 7, wherein the deleting preset operation instructions matched with the target preset operation instructions in the scene to be processed comprises:

taking, in the scene to be processed, an operation instruction corresponding to a smart device the same with one of the target preset operation instructions corresponds to as an operation instruction to be deleted; and deleting the operation instruction to be deleted in the scene to be processed, in response to parameter information of the operation instruction to be deleted matching parameter information of the corresponding one of the target preset operation instructions.

10. The method as claimed in claim 9, wherein the parameter information of the operation instruction to be deleted matching parameter information of the corresponding one of the target preset operation instructions comprises:

a difference between the parameter information of the operation instruction to be deleted and the parameter information of the corresponding one of the target preset operation instructions being less than a predetermined value.

11. The method as claimed in claim 1, wherein the higher the priority of the scene, the higher the order of the scene in the execution sequence.

12. An electronic device, comprising:
one or more processors;
a memory; and
one or more application programs stored in the memory, wherein the one or more application programs, when executed by the one or more processors, are configured to implement:

acquiring, from a scene correspondence, a plurality of scenes corresponding to a scene-trigger condition, wherein the scene correspondence is pre-stored, and comprises a plurality of scene-trigger conditions and at least one scene corresponding to each of the plurality of scene-trigger conditions, and
wherein each scene of the plurality of scenes comprises multiple operations corresponding to respective smart devices in the scene, and the electronic device is configured to realize data interaction with the smart devices as controlled devices;
acquiring a priority of each scene of the plurality of scenes, wherein acquiring the priority of each scene of the plurality of scenes comprises:
acquiring, from a correspondence between the plurality of scenes and description information of the plurality of scenes, preset operation instructions of each smart device in each scene, comprising:
searching the description information of the scene corresponding to each of the plurality of scenes corresponding to the scene-trigger condition in the correspondence between the plurality of scenes and description information of the plurality of scenes;
parsing the description information of the scene to determine the preset operation instructions of each smart device corresponding to the scene;
wherein the description information of each scene comprises multiple operations corresponding to respective smart devices in the scene;
acquiring historical operation data of each smart device under the scene-trigger condition; and
determining the priority of each scene according to the historical operation data and the preset operation instructions of each smart device;
sorting the plurality of scenes according to the priority of each scene, and obtaining an execution sequence for the plurality of scenes;
finding a scene with an order in the execution sequence meeting a preset standard as a forbidden scene; and
executing a scene other than the forbidden scene in the plurality of scenes according to the execution sequence, wherein the executing the plurality of scenes according to the execution sequence comprises:
sending operation instructions, when executing each scene, to the respective smart devices in the scene.

13. The electronic device as claimed in claim 12, wherein the acquiring a priority of each scene of the plurality of scenes comprises:
searching a scene with a user-set priority as a first scene set;
taking a scene outside the first scene set as a second scene set;
acquiring preset operation instructions of each smart device in each scene in the second scene set;
acquiring, under the scene-trigger condition, historical operation data of each smart device in each scene in the second scene set; and
determining the priority of each scene in the second scene set according to the historical operation data and the preset operation instructions of each smart device, wherein the priority of each scene in the first scene set is greater than the priority of each scene in the second scene set.

14. The electronic device as claimed in claim 12, wherein the finding a scene with an order in the execution sequence meeting a preset standard as a forbidden scene comprises:
taking last N scenes in the execution sequence as the forbidden scene, N being a positive integer greater than 1.

15. The electronic device as claimed in claim 12, the one or more application programs, when executed by the one or more processors, are further configured to implement: before sorting the plurality of scenes according to the priority of each scene,
acquiring target preset operation instructions of each smart device in a target scene, the target scene being one of the plurality of scenes;
selecting a scene to be processed from the plurality of scenes according to the priority of the target scene; and
deleting preset operation instructions matched with the target preset operation instructions in the scene to be processed.

16. The electronic device as claimed in claim 15, wherein the selecting a scene to be processed from the plurality of scenes according to the priority of the target scene comprises:
taking a scene with priority lower than the priority of the target scene as the scene to be processed.

17. A non-transitory computer readable medium storing program codes which, when called and executed by a processor, causes the processor to perform:
acquiring a plurality of scenes corresponding to a scene-trigger condition;
displaying scene information corresponding to each scene;
acquiring a user-set priority based on the displayed scene information;
searching a scene with the user-set priority as a first scene set;
taking a scene outside the first scene set as a second scene set;
acquiring preset operation instructions of each smart device in each scene in the second scene set;
acquiring, under the scene-trigger condition, historical operation data of each smart device in each scene in the second scene set;
determining the priority of each scene in the second scene set according to the historical operation data and the preset operation instructions of each smart device, wherein the priority of each scene in the first scene set is greater than the priority of each scene in the second scene set;
sorting the plurality of scenes according to the priority of each scene, and obtaining an execution sequence for the plurality of scenes; and
executing the plurality of scenes according to the execution sequence;
wherein before the sorting the plurality of scenes according to the priority of each scene, the processor performs:
acquiring target preset operation instructions of each smart device in a target scene, the target scene being one of the plurality of scenes;
selecting a scene to be processed from the plurality of scenes according to the priority of the target scene;
taking, in the scene to be processed, an operation instruction corresponding to a smart device the same with one of the target preset operation instructions corresponds to as an operation instruction to be deleted; and
deleting the operation instruction to be deleted in the scene to be processed, in response to parameter information of the operation instruction to be deleted matching parameter information of the corresponding one of the target preset operation instructions.

* * * * *